United States Patent [19]
Quercetti

[11] Patent Number: 5,114,349
[45] Date of Patent: May 19, 1992

[54] ELEMENT FOR A DIDACTIC PLAY, AND A SET FORMED BY SUCH ELEMENTS

[76] Inventor: Alessandro Quercetti, Strada San Vito a Revigliasco 48, I-10133 Torino, Italy

[21] Appl. No.: 612,124

[22] Filed: Nov. 9, 1990

[30] Foreign Application Priority Data

Nov. 17, 1989 [IT] Italy ............... 68012 A/89

[51] Int. Cl.⁵ .................... G09B 1/22; G09B 1/10
[52] U.S. Cl. .................... 434/403; 40/482; 446/236; 434/161; 434/172
[58] Field of Search ............... 434/156, 159, 160, 161, 434/167, 170, 171, 172, 176, 365, 402, 403; 40/482, 492; 446/236, 118, 406; 273/DIG. 26

[56] References Cited

U.S. PATENT DOCUMENTS

| D. 29,649 | 11/1898 | Stein | 273/156 |
|---|---|---|---|
| 1,194,216 | 8/1916 | Morse | 434/403 |
| 2,049,178 | 7/1936 | Samstag . | |
| 3,128,100 | 4/1964 | Sinden | 273/153 |
| 3,219,023 | 11/1965 | Ryan | 446/473 |
| 3,235,976 | 2/1966 | Elliott et al. | 434/170 |
| 4,021,939 | 5/1977 | May | 434/403 |
| 4,146,978 | 4/1979 | Breslow | 446/236 X |

FOREIGN PATENT DOCUMENTS

| 799161 | 3/1936 | France | 434/167 |
|---|---|---|---|
| 2508329 | 12/1982 | France . | |
| 442352 | 11/1948 | Italy | 434/159 |
| 86089 | 8/1957 | Netherlands | 434/365 |

Primary Examiner—John G. Weiss
Assistant Examiner—L. Thomas
Attorney, Agent, or Firm—Young & Thompson

[57] ABSTRACT

An element for a didactic play, of the type capable of showing several surfaces carrying different representations, which may possibly be combined with the representations of other elements forming a set, in order to compose writings, images or the like, comprising a support, a prismatic body pivoted on the support and carrying on its faces some representations, and a control member carried by the support and capable, when operated, of acting on the prismatic body by causing a rotation thereof along the angle by which each face of the element is replaced by the subsequent face. The control member is formed by a push-button whose operation causes a rotation of the prismatic body in a preestablished direction by acting, by means of a pawl being a part of an inner operating member, onto an arrangement with escapement wheel carried by an end of the prismatic body. The set of such elements moreover includes a tray suitable for containing a number of elements, ordered by lines and columns.

13 Claims, 2 Drawing Sheets

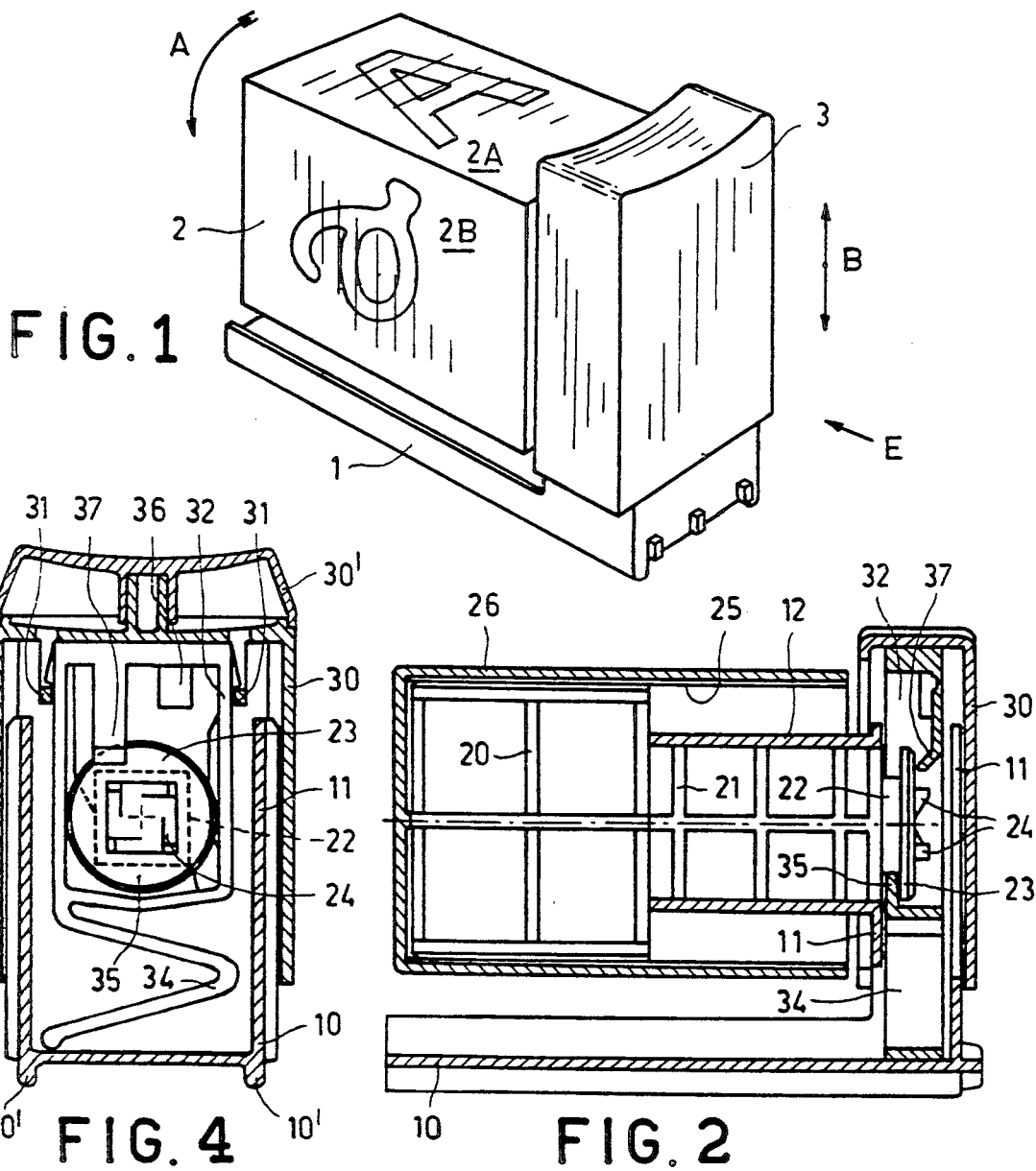

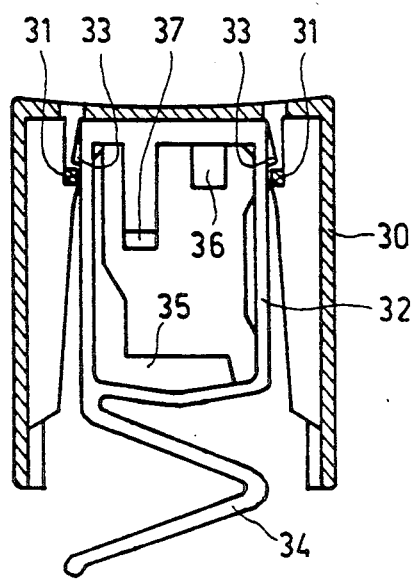
FIG.6
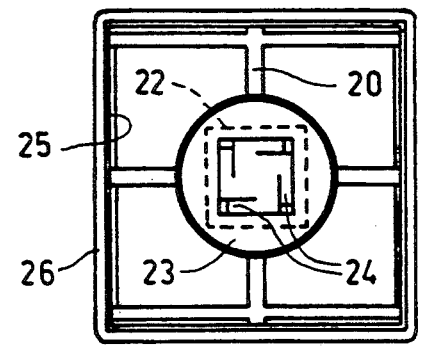
FIG.7
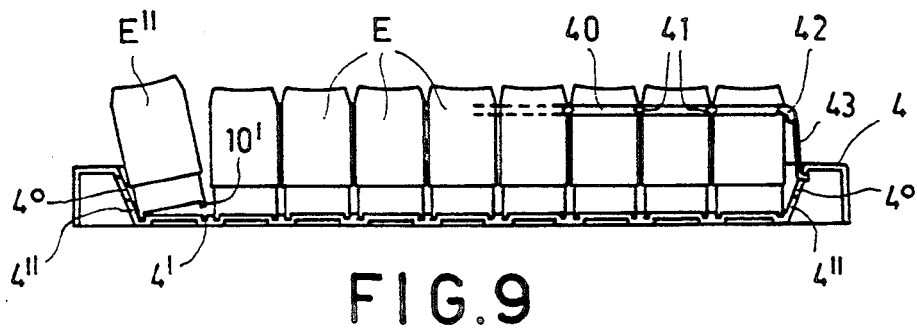
FIG.9
FIG.8

ELEMENT FOR A DIDACTIC PLAY, AND A SET FORMED BY SUCH ELEMENTS

DESCRIPTION

1. Background of the Invention

The present invention concerns an element for a didactic play, of the type capable of showing several surfaces carrying different representations, which may possibly be combined with the representations of other elements forming a set, in order to compose writings, images or the like.

The prototype of this kind of elements is the play of the so-called "cubes", comprising a set of cubic shaped elements each having six square surfaces carrying different representations which are portions of images. The various entire images may be restored by combining the different cubes of the set, adequately arranged and oriented Due to their simplicity of structure and operation, such cubes are suitable for very young children, however their use involves low incentives and therefore the interest in this play does not last long.

A development of this play, more suitable for showing some didactic contents, is the socalled "alphabeter", formed by tables comprising several elementar mechanisms each usually showing a representation, which may be temporarily replaced by one or more different representations by operating a push-button. For example, the usually shown representation may consist of a upper-case letter of the alphabet, impressed onto the surface of a whing which rises as a consequence of the operation of a corresponding push-button, thus uncovering the representation of the pertinent lower-case letter accompanied by the image of an object whose name commences with the considered letter The heuristic contents of such a play are considerable and, also in view of its mechanical character, it offers incentives which, under some points of view, are higher than those of the foregoing cubes, but its limitation consists in that the representations shown by each elementar mechanism are in fixed positions in the alphabeter, whereby each of them stands for itself and can in no way be combined with the representations shown by the other mechanisms. Under this point of view an alphabeter appears to be inferior to the simple cubes.

2. Brief Summary of the Invention

The object of this invention is to provide an element for a didactic play, which may be used singularly or in combination with other similar elements, and on one hand shows the interest of a mechanical operation, such as the alphabeters, and on the other hand also offers the possibility, typical of the cubes, of allowing a combination of the representations of different elements in order to compose a writing or an image.

This object is attained, according to the invention, by means of an element comprising a support, a prismatic body pivoted on said support and carrying on its faces some representations, and a control member carried by said support and capable, when operated, of acting on the prismatic body by causing a rotation thereof along the angle by which each face of the element is replaced by the subsequent face.

Thanks to this structure, the element user may bring in the shown position, by operating once or several times the control member, whichever of the different faces of the prismatic body, which carry different representations, and thus he may choose the representation shown by the element among those which are present on it and are shown in a foreseenable serial succession as a consequence of the repeated operation of the control member. Moreover the element may be displaced with respect to other elements forming a set, in order to impart to the representations of the different elements a logical succession, for example such as to compose a writing or an image. In this manner the play offers to the user a whole of incentives capable of maintaining a long lasting interest, to the advantage of the didactic effect too.

Preferably said control member is formed by a push-button whose operation causes a rotation of the prismatic body in a preestablished direction. The operation facility of a push-button minimizes the difficulty in the use of the element, whereas, known the direction of the prismatic body rotation caused by the push-button, and therefore the order in which its faces are serially shown, the play user may quickly foresee which of the prismatic boby faces will be shown as a consequence of a certain number of operations of the push-button, and therefore he may effect without perplexity the needed operation.

It is of advantage that the set of elements additionally comprises a tray, capable of containing a certain number of elements ordered by lines and columns, thus facilitating an ordered development of the composition of the writing or image, resulting from the appropriate combination of different elements.

BRIEF DESCRIPTION OF THE DRAWINGS

These and other features and advantages of the subject of this invention will appear more clearly from the following description of some embodiments, given as non limitative examples and diagrammatically shown in the appended drawings, wherein:

FIG. 1 shows in a perspective view an element according to the invention, comprising a prismatic body having square cross-section and a control member in the form of a push-button;

FIG. 2 and FIG. 3 show two cross sectional views thereof, the one vertical and the other horizontal;

FIG. 4 shows a cross section taken in correspondence with the push-button control member, in a modified embodiment of this latter;

FIG. 5 shows a cross section of the prismatic body which carries the representations;

FIG. 6 shows singularly a cross section through the push-button control member, and it shows the parts forming the mechanisms intended to cause the rotation of the prismatic body;

FIG. 7 shows an end view of the prismatic body, and it illustrates the members intended to cooperate with the push-button in order to cause the rotation;

FIG. 8 shows a plan view of a tray which orderly contains a certain number of elements according to the invention; and FIG. 9 shows a longitudinal vertical cross section thereof, taken along line IX—IX of FIG. 8.

DETAILED DESCRIPTION OF THE PREFERRED EMBODIMENTS

As it appears from FIG. 1, an element according to the invention, designated in its whole by the reference E, comprises a support, designated in its whole by the reference 1, a prismatic body, designated in its whole by the reference 2, and a control member, designated in its whole by the reference 3. The body 2, in this case, has a square cross section and it is pivoted on support 1 along a horizontal axis in such a manner as to be allowed to rotate according to the curved arrow A. The control member 3, in this case, is a push-button, and it is mounted on support 1 in such a manner as to be allowed to slide in vertical direction according to the double arrow B. When the support 1 of such an element rests on an approximately horizontal plane, the upper face 2A of the prismatic body 2 is displayed and clearly evident, whereas the other faces thereof may be examined by manipulating the element, but they are not in a displayed position. In the example shown, face 2A shows the representation of an upper case letter A, whereas face 2B shows the representation of a lower case letter a. Some mechanisms described later on operatively connect the push-button 3 to the prismatic body 1 in such a manner that a pressure applied onto the push-button 3, which lowers it according to the arrow B, causes a rotation of the prismatic body 2 according to arrow A along a quarter of a turn, whereby the formerly shown face 2A takes the place of face 2B, whilst the place formerly occupied by face 2A is taken by the face opposite the face 2B, which thus is displayed. Elastic means return the push-button 3 to its start position when the pressure applied thereto is released.

In this manner, as it may be understood, by applying once, twice or three times a pressure onto the push-button 3, one can bring into the displayed position whichever face of the prismatic body 2, at the place of the formerly displayed face 2A. On the faces of the prismatic body 2 there may be applied any kind of representations, such as letters, numbers, complete images or portions of images. For example, the different faces of a prismatic body 2 may show an upper-case letter, the corresponding lower-case letter, the image of an object whose name initiates by the considered letter, and moreover another representation, which may be logically correlated to the first ones or not. The first three representations referred to allow to simulate the operation of an alphabeter element, with the advantage that the selected representation is displayed in permanent way and not only temporarily. However, of course, the representations applied to the different faces of the prismatic body 2 might also be chosen according to a criterion different from that set forth as an example Particularly, one or more of these representations may be portions of an image which can be composed by adequately putting near different elements, as it will be explained later on.

Constructionally, with reference to FIGS. 2 to 4, the support designated in its whole as 1 comprises a rest basis 10, from which vertically rises a upright 11 intended to form a guide for the push-button 3, and which extends horizontally in a cylindrical tubular part 12 forming a bearing for the prismatic body 2 which carries the representations With reference to FIGS. 2 to 5 and 7, the prismatic body designated in its whole as 2 comprises firstly a substantially cubic part 20, preferably having a lightened structure, from which projects a substantially cylindrical part 21, preferably lightened too, which forms a trunnion rotatably mounted into the cylindrical tubular part 12 of support 1. Said cylindrical part 21 terminates, at the end opposite the cubic part 20, with a square section 22 and a disk 23 onto which there are formed projections 24 constituting an escapement wheel with four positions. The parts described until now are preferably formed of plastics. Onto the substantially cubic part 20 of the prismatic body 2 there is applied a sheet element 25, bent in order to form a square based prism and carrying on its outer faces the desired representations. This sheet element 25 may be, for example, a simple rectangular printed cardboard, in which there are preferably impressed the needed folding lines. Over the sheet element 25 is inserted a hollow case 26 of transparent material, which keeps the sheet element in correct shape and position onto the prismatic body 20, and due to its transparency allows observing the representations printed on the sheet element 25. The case 26 may preferably be formed of transparent plastics.

The hollow case 26 may be definitively fixed on the cubic part 20 of the prismatic body 2, and in such case the sheet element 25 is fixed too. Alternatively, the hollow case 26 may be applied in a removable way, for example it may be slipped off the cubic part 20 of the prismatic body 2, and in such case the sheet element may be removed and replaced by another sheet element carrying different representations.

With reference to FIGS. 2 to 4 and 6, the push-button designated in its whole as 3 comprises a hollow element 30, which is so shaped that it may be slipped on the upright 11 of support 1, by which it is guided in its displacement according to the arrow B of FIG. 1, and has two inner ears 31 intended to receive the connection of an inner operating element. The hollow element 30 is suitably formed of plastics, preferably an opaque plastics in order to conceal the inner mechanisms. As it is shown by FIG. 4, the push-button may be provided at its top with an element 30' forming a key, which allows more easy operation and improves the appearance of the push-button.

The inner operating member (FIG. 6) is formed by a frame 32 pro with wings 33 for being connected to the ears 31, and it terminates at bottom with a bent portion 34 forming a spring, in order to rest against the base 10 of support 1 and to push the whole push-button 3 towards its start position. The frame 32 has a cross projection 35 which, when the push-button is in its start position, cooperates with the square section 22 of the prismatic body 2 by preventing its rotation, whilst it does not prevent such rotation when the push-button is lowered. Moreover the frame 32 has a stop projection 36 which rests against the square section 22 of the prismatic body 2 when the push-button 3 attains its lower end stroke position Finally, the frame 32 has an elastic pawl 33 so arranged that it may cooperate, during lowering of the push-button 3, with the escapement wheel formed by the projections 24 of disk 23 of the prismatic body 2. The inner operating element 32-37 is preferably formed of plastics having the good characteristics of elasticity needed for the part 34 forming a spring and for the elastic pawl 37.

When the described parts are suitably shaped, for example as shown by the drawings, the coupling between the frame 32 of the push-button 3 and the disk 23 of the prismatic body 2 also attains the double purpose of preventing that the prismatic body 2 unintentionally slips off the cylindrical part of support 1, and preventing that the push-button 3 unintentionally slips off the upright 11 of support 1.

Preferably, as shown by FIGS. 2 and 3, base 10 extends in its longitudinal direction slightly beyond the ends of the prismatic body 2 and the push-button 3, so as to ensure a suitable spacing between elements placed in succession.

The operation of the described mechanism is as follows. In the start position of the push-button 3, displaced upwards and kept by spring 34, the cross projection 35 of frame 32, by coupling with the square section 22 of the prismatic body 2, prevents any rotation of this latter. The element behaves therefore as a solid body which displays a representation printed on the upper face 2A of the prismatic body 2, and it may be manipulated, particularly in order to compose the same with other similar elements, without the displayed representation incurring in unintentional displacements.

When it is desired to change the representation displayed by the element, the push-button 3 is lowered by pressing the same against the action of spring 34. Then the cross projection 35 ceases to prevent the rotation of the prismatic body 2, and that rotation is caused, in the direction of arrow A in FIG. 1, by the elastic pawl 37 cooperating with one of the projections 24 forming an escapement wheel. When the thus caused rotation attains 1/4 of a turn, the stop projection 36 contacts the square section 22 of the prismatic body 2 and stops any further displacement of both this latter and the push-button 3. The prismatic body 2 is therefore stopped in a position exactly displaced by ¼ of a turn with respect to the former position, and this even if it tends, by inertia, to continue its rotation, as it may happen when the push-button 3 is rudely operated. When finally the pressure applied to the push-button 3 is released, spring 34 causes the push-button 3 to return to its start position, and the cross projection 35 again engages the square section of the prismatic body 2, by stopping this latter in the new position it has attained. During this return stroke the pawl 37, thanks to its elasticity, warps and overcomes the facing projection 24. The whole mechanism has therefore attained again its start position, and then the element may be left in the new condition attained, in which it displays a representation different from the former one, or another pressure may be applied onto the push-button 3 in order to further change the representation shown by the element.

An element as described may be used singularly, but preferably it is a part of a set of similar elements showing different representations, and these elements, after selection of the representation shown by each of them, done by operating the respective push-buttons, may be suitably put one near the other in order to compose a writing or an image. The possibility of modifying the writing or the image is highly increased if the sheet element carrying the representations is changeable, as already pointed out.

The composition may be executed freely by laying the different elements on any plane surface, but it is of advantage that the composition is guided by providing a tray 4 (FIGS. 8 and 9), arranged to contain a certain number of elements E orderly disposed, for example on three lines and nine columns as in the case shown by the drawing. It is suitable that the plane of the tray 4 has grooves 4' wherein may be inserted bottom projections 10' (FIG. 4) of the contained elements E in order to define their positions. Moreover it is of advantage that the side rims 4" of tray 4 are so inclined that the elements E can tilt laterally (as shown in FIG. 9 for the element E"), whereby no hinder is encountered in the rotation of the prismatic bodies 2 of the elements, when the corresponding push-buttons are operated. As shown in E', the elements E may in certain cases be inserted in the tray upside-down with respect to the elements of the overlying or underlying line, namely with the respective push-buttons spaced, which allows disposing immediately near the representations displayed by a group of elements, thus composing an entire image not interrupted by the presence of the push-buttons.

This way one can compose either writings, by using the representations of letters and numbers shown by the elements, or images whose portions are offered by the representations of the individual elements, or even complex figures including writings and images, all this by using the representations existing on the elements or by choosing sheet elements carrying the desired representations and mounting the same onto the individual elements of the set of elements.

The number of the elements forming a set may correspond to the number of elements contained by a tray, or even more elements may be offered to the selection, only a part of which is to be used for composing the elements in the tray. Moreover it is possible to insert in a tray a number of elements corresponding to the number which may be contained minus one, thus leaving a free place and therefore allowing the attainment of the desired composition through subsequent displacements of the elements adjacent the free place. In this way there is obtained a pastime similar to the known ones of this kind, which are realized by means of elements displaceable with respect to a free place, but allow no possibility of modifying the representation composed by the elements.

In order to keep in their place the elements E in tray 4 during the transportation or the exhibition for sale, it is suitable that some retainment strips are used, a section of which is shown in the right hand portion of FIGS. 8 and 9. Each retainment strip is formed by two elongated members 40 connected the one another by cross elements 41 and terminated by end elements 42 provided with retainment hooks 43. Such strips are laid down over the lines of elements E by covering their prismatic bodies, and the retainment hooks 43 are engaged in corresponding openings 4° provided for in the inclined rims 4" of tray 4.

Of course, different modifications may be made to what has been described and shown by way of example. For example, the prismatic body 2 could have a triangular, rather that square, cross section, with the consequent modifications of the mechanism, which for each operation of the push-button 3 should then give rise to rotations of ⅓, rather than ¼, of a turn. The mechanism with pawl and escapement wheel could be embodied in a manner different from that shown as an example The control member could be embodied by a small lever rather than by a push-button, or even in other manners.

I claim:

1. An element for a didactic play, comprising a support, a prismatic body having several angularly spaced faces, representations applied to said faces of the prismatic body, said prismatic body being pivoted on said support, and a control member movably carried by said support and operatively connected with said prismatic body so as to cause a rotation of said prismatic body on operation of said control member, said rotation extending along the angle which separates the adjacent faces of said prismatic body, whereby on each operation of said control member each face of said prismatic body is replaced in its position by the subsequent face, and therefore the displayed representation is replaced by the representation carried by the subsequent face.

2. An element for a didactic play, as set forth in claim 1, wherein said support comprises a basis for rest, a upright which rises from said basis and serves as a guide for said control member, and a hollow cylindrical part which serves as a bearing for said prismatic body.

3. An element for a didactic play, as set forth in claim 1, wherein said control member is a push-button whose lowering causes a rotation of the prismatic body in a preestablished direction.

4. An element for a didactic play, as set forth in claim 2, wherein said control member is a push-button, and said push-button has a hollow shape, is slidingly inserted on said upright of the support, has connection means, comprises an inner operating member engaged by said connection means, and may include a superimposed key.

5. An element for a didactic play, as set forth in claim 1, wherein said prismatic body comprises a main part of square cross section and a substantially cylindrical part extending on one side of said main part of square cross section, said substantially cylindrical part being suitable for acting as a trunnion and having at its end conformations capable of defining a mechanism for actuating the rotation.

6. An element for a didactic play, as set forth in claim 5, wherein said conformations capable of defining a mechanism for actuating the rotation comprise a square section, a disk, and projections formed on said disk and defining an escapement wheel.

7. An element for a didactic play, as set forth in claim 5, comprising a sheet element formed by a bent rectangular cardboard, on which are printed said representations of the element, said sheet element being applied to said main part of square cross section of the prismatic body, and further comprising a transparent prismatic case slipped on said sheet element so as to keep the same in correct form and position.

8. An element for a didactic play, as set forth in claim 7, wherein said transparent prismatic case is removably slipped on said part of square cross section of the prismatic body, in so as to allow replacing said sheet element.

9. An element for a didactic play, as set forth in claim 6, wherein said control member has an inner operating member, said inner operating member comprises a frame surrounding said conformations defining a mechanism for actuating the rotation of said prismatic body, and said frame has projections cooperating with said square section in order to stop the prismatic body when the control member is in its start position, has a stop projection cooperating with said square section when said control member is completely lowered, has an elastic pawl cooperating with said projections forming an escapement wheel, and has a bent part forming a return spring for the control member.

10. An element for a didactic play, as set forth in claim 9, wherein said frame of the inner operating member of the control member and the inner end of the prismatic body are shaped so as to mutually engage by preventing any unintentional slipping off of both said parts.

11. A set of elements for a didactic play as set forth in claim 1, which comprises a number of said elements and additionally comprises a tray, capable of containing a certain number of said elements ordered by lines and columns.

12. A set of elements as set forth in claim 11, wherein said elements have bottom projections, and said tray has grooves suitable for receiving said bottom projections of the contained elements, and it has inclined side rims which allow a limited tilt of the contained elements.

13. A set of elements as set forth in claim 11, further comprising retainment strips, each retainment strip comprising two elongated members, cross elements and end elements mutually connecting said two elongated members, and retainment hooks provided on said end elements, and wherein said tray comprises hooking openings, said hooks of the strips being intended to engage the corresponding hooking openings of the tray.

* * * * *